United States Patent [19]

Fukuyama et al.

[11] Patent Number: 5,092,624
[45] Date of Patent: Mar. 3, 1992

[54] SUSPENSION CONTROL SYSTEM WITH VARIABLE STEERING CHARACTERISTICS

[75] Inventors: Kensuke Fukuyama; Naoto Fukushima; Yohsuke Akatsu; Itaru Fujimura; Masaharu Satoh, all of Kanagawa, Japan

[73] Assignee: Nissan Motor Company, Ltd., Japan

[21] Appl. No.: 575,010

[22] Filed: Aug. 30, 1990

[30] Foreign Application Priority Data

Aug. 31, 1989 [JP] Japan ................... 1-225580

[51] Int. Cl.⁵ .............................. B60G 17/01
[52] U.S. Cl. .................... 280/707; 364/424.05
[58] Field of Search ............. 280/707, 689, 772; 364/424.05

[56] References Cited

U.S. PATENT DOCUMENTS

| | | | |
|---|---|---|---|
| 4,333,668 | 6/1982 | Hendrickson et al. | |
| 4,679,808 | 7/1987 | Ito | 280/91 |
| 4,690,431 | 9/1987 | Ito | 280/91 |
| 4,948,164 | 8/1990 | Hano | 280/707 |

FOREIGN PATENT DOCUMENTS

| | | |
|---|---|---|
| 0283004 | 9/1988 | European Pat. Off. |
| 0285153 | 10/1988 | European Pat. Off. |
| 0286072 | 10/1988 | European Pat. Off. |
| 0306004 | 3/1989 | European Pat. Off. |
| 3502334A1 | 7/1985 | Fed. Rep. of Germany |
| 1-95927 | 4/1989 | Japan ................ 280/707 |

Primary Examiner—Charles A. Marmor
Assistant Examiner—Karin Tyson
Attorney, Agent, or Firm—Lowe, Price, LeBlanc & Becker

[57] ABSTRACT

A suspension control system employs a first lateral acceleration sensor for monitoring a lateral acceleration at a first point on a vehicular body and a second lateral acceleration sensor for monitoring lateral acceleration at a second point on the vehicular body, which second point is provided at a longitudinally offset position from the first point. A controller derives a lateral shifting of vehicular load at the front suspension systems on the basis of a first lateral acceleration monitored by the first lateral acceleration sensor, and a lateral shifting of the vehicular load at a rear suspension system on the basis of a second lateral acceleration monitored by the second lateral acceleration sensor. Control for front and rear suspension systems is performed independently on the basis of the lateral load shifting at the front and rear suspension systems.

18 Claims, 11 Drawing Sheets

SUSPENSION CONTROL SYSTEM WITH VARIABLE STEERING CHARACTERISTICS

BACKGROUND OF THE INVENTION

1. Field of the Invention

The present invention relates generally to a suspension control system for an automotive vehicle. More specifically, the invention relates to a suspension control system which provides variable steering characteristics for optimizing vehicular cornering performance.

2. Description of the Background Art

The Japanese Patent First (unexamined) Publication (Tokkai) Showa 61-181712 discloses an active suspension system. In the disclosed system, hydraulic cylinders each with a variable pressure chamber are provided in respective suspension systems disposed between a vehicular body and respective road wheels. The system includes an acceleration sensor for monitoring acceleration exerted on the vehicular body. The acceleration sensor produces an acceleration indicative signal representative of the monitored magnitude of acceleration. The system arithmetically derives variation of load exerted between said vehicular body and each road wheel for controlling the fluid pressure in the variable pressure chamber based thereon.

In such prior proposed systems, a lateral acceleration monitored at a single point is commonly used for deriving lateral shifting of vehicular load at front suspension systems and the rear suspension systems. Therefore, load distribution between the front and rear suspension systems is maintained uniform so that steering characteristics may not be changed under any vehicular driving condition.

SUMMARY OF THE INVENTION

Therefore, it is an object of the present invention to provide an active suspension system which can vary steering characteristics depending upon vehicular driving conditions and thus can optimize vehicular cornering characteristics.

In order to accomplish the aforementioned and other objects, an active suspension system, according to the present invention, employs a first lateral acceleration sensor for monitoring lateral acceleration at a first point on a vehicular body and a second lateral acceleration sensor for monitoring lateral acceleration at a second point on the vehicular body, which second point is oriented at a longitudinally offset position from the first point. A controller derives a lateral shifting of vehicular load at the front suspension systems on the basis of a first lateral acceleration monitored by the first lateral acceleration sensor, and a lateral shifting of vehicular load at the rear suspension systems on the basis of a second lateral acceleration monitored by the second lateral acceleration sensor. Control for front and rear suspension systems is performed independently on the basis of the lateral load shifting at front and rear suspension systems.

According to one aspect of the invention, a suspension control system comprises:

front suspension systems disposed between a front portion of a vehicular body and front wheels thereof for damping relative displacement therebetween, each of the front suspension systems having damping characteristics variable according to a front suspension control command;

rear suspension systems disposed between a rear portion of the vehicular body and rear wheels thereof for damping relative displacement therebetween, each of the rear suspension systems having damping characteristics variable according to a rear suspension command;

lateral acceleration monitoring means for monitoring lateral acceleration at a first position on the vehicular body for producing a first lateral acceleration indicative signal and monitoring lateral acceleration at a second position longitudinally off-set from the first position, for producing a second lateral acceleration indicative signal; and a control unit receiving the first and second lateral acceleration indicative signals for deriving the front suspension control command on the basis of the first lateral acceleration indicative signal and deriving the rear suspension control command on the basis of the second lateral acceleration indicative signal, for suppressing vehicular rolling motion.

Preferably, the second position is oriented at frontwardly off-set position relative to the first position. The lateral acceleration monitoring means may include a first lateral acceleration sensor arranged at a third position on the vehicular body for producing a first sensor signal representative of the lateral acceleration at the third position, a second lateral acceleration sensor arranged at a fourth position longitudinally with respect to the third position for producing a second sensor signal representative of the lateral acceleration at the fourth position, and arithmetic means for arithmetically driving lateral accelerations at the first and second positions on the basis of the first and second sensor signals. In such case, the first and second positions may be variable depending upon yawing angular acceleration generated about the center of gravity of the vehicular body. For example, the first and second positions are so determined that the magnitude of the lateral acceleration higher at the second position while a vehicular steering angle displaces from a neutral angular position and that a lower magnitude of lateral acceleration is provided for the lateral acceleration at the second position while the vehicular steering angle is displaced toward the neutral angular position. For enabling this, the suspension control system may further comprise a vehicle speed sensor for producing a vehicle speed signal representative of the sensed vehicle speed, and the first and second positions are variable depending upon the vehicle speed.

Preferably, the second position is shifted to decrease a distance from the center of gravity of the vehicular body according to increasing of the vehicular speed, and the second position is shifted to decrease a distance thereof from the first position according to increasing of the vehicle speed. In the alternative, the second position is shifted to increase a distance from the center of gravity of the vehicular body according to increasing of the vehicular speed, and the second position is shifted to decrease a distance from the first position according to increasing of the vehicle speed.

According to another aspect of the invention, a suspension control system comprises:

front suspension systems disposed between a front portion of a vehicular body and respective front wheels thereof for damping relative displacement therebetween, each of the front suspension systems having damping characteristics variable according to a front suspension control command;

rear suspension systems disposed between a rear portion of the vehicular body and respective rear wheels thereof for damping relative displacement therebetween, each of the rear suspension systems having damping characteristics variable according to a rear suspension command;

lateral acceleration monitoring means for monitoring a lateral acceleration at a first position on the vehicular body for producing a first lateral acceleration indicative signal and monitoring a lateral acceleration at a second position on the vehicular body for producing a second lateral acceleration indicative signal, the levels of the lateral acceleration sensors at the first and second positions being differentiated with respect to each other so that the magnitude of lateral acceleration at the second position is greater than that at said first position least at when the vehicular body enters a curve; and a control unit responsive to the first and second lateral acceleration indicative signals for deriving the front suspension control command on the basis of the first lateral acceleration indicative signal and deriving the rear suspension control command on the basis of the second lateral acceleration indicative signal, for suppressing vehicular rolling motion.

At least one of the first and second positions is longitudinally off-set from a gravity center of the vehicular body. Also, the second position may be selected so as to subject greater magnitude of yawing angular acceleration than the first position at least the entrance of the curve.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
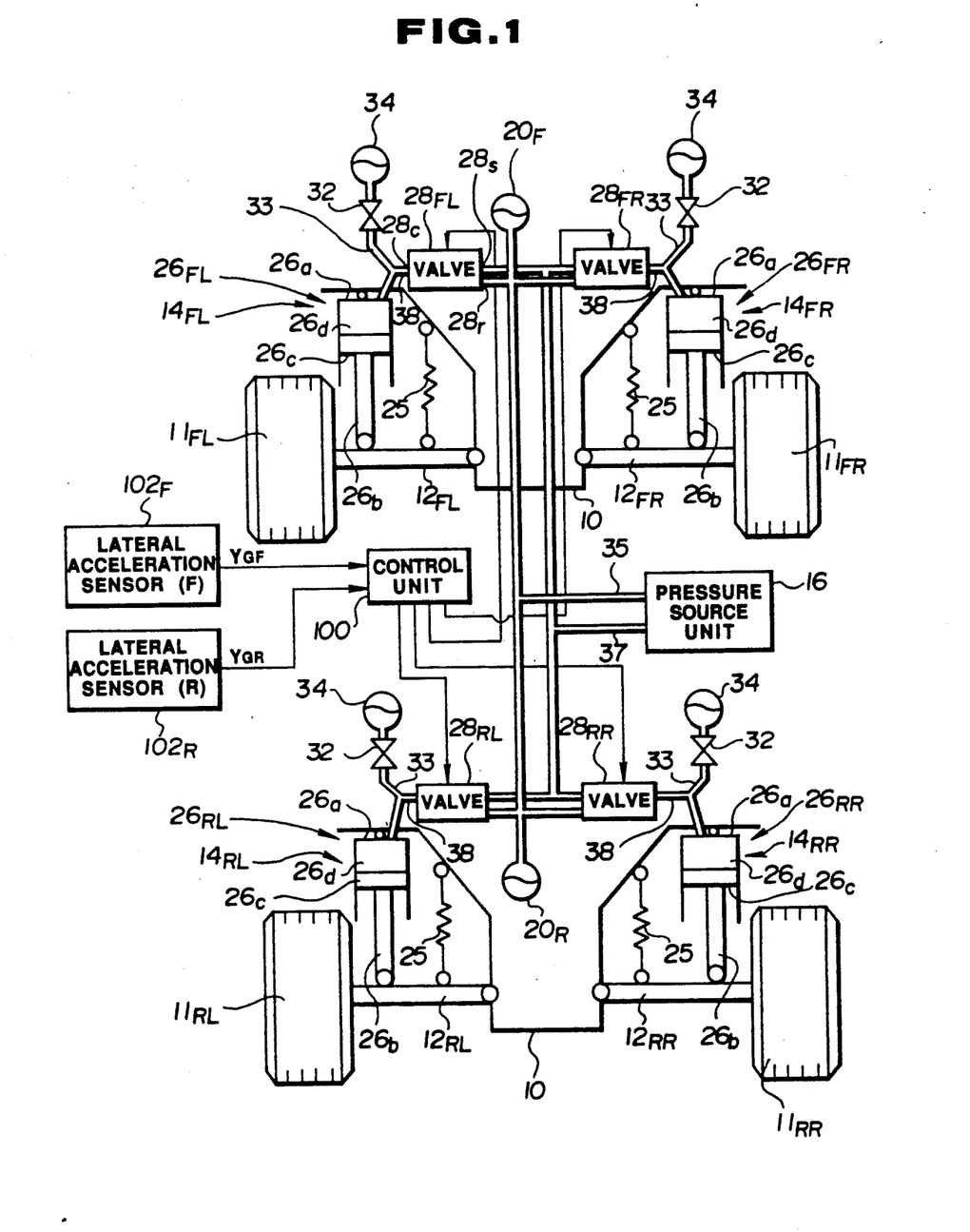
FIG. 1 is a diagrammatic illustration showing the preferred embodiment of an active suspension system according to the present invention.
Figure 2:
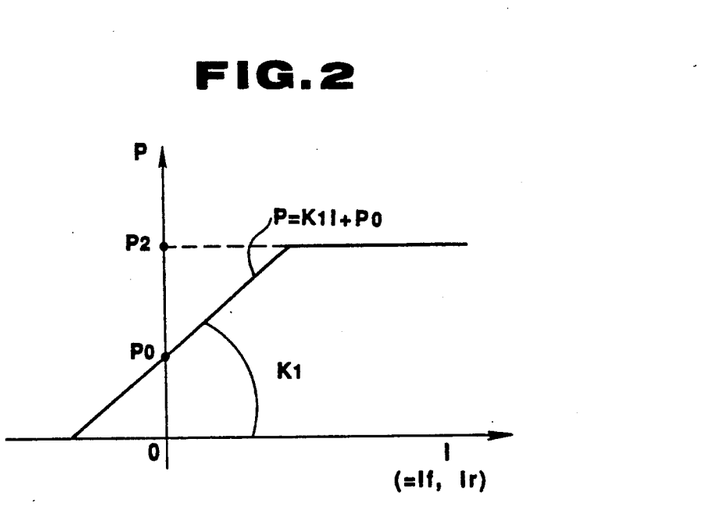
FIG. 2 is a chart showing a relationship between current value of suspension control command and control pressure.

Referring now to the drawings, particularly to FIG. 1, the preferred embodiment of an active suspension system, according to the present invention, is designed to generally perform suspension control for regulating vehicular height level and vehicular attitude by suppressing relative displacement between a vehicular body 10 and suspension members $12_{FL}$, $12_{FR}$, $12_{RL}$ and $12_{RR}$ of front-left, front-right, rear-left and rear-right suspension mechanism $14_{FL}$, $14_{FR}$, $14_{RL}$ and $14_{RR}$ and rotatably supporting front-left, front-right, rear-left and rear-right wheels $11_{FL}$, $11_{FR}$, $11_{RL}$ and $11_{RR}$. The suspension mechanism generally will be referred to will be hereinafter by the reference numeral "14". Respective front-left, front-right, rear-left and rear-right suspension mechanisms $14_{FL}$, $14_{FR}$, $14_{RL}$ and $14_{RR}$ have hydraulic cylinders $26_{FL}$, $26_{FR}$, $26_{RL}$ and $26_{RR}$ which will be represented by the reference numeral "26" as generally referred to.

Each of the hydraulic cylinders 26 is disposed between the vehicular body 10 and the suspension member $12_{FL}$, $12_{FR}$, $12_{RL}$ and $12_{RR}$ to produce a damping force for suppressing relative displacement between the vehicular body and the suspension member. The hydraulic cylinder 26 generally comprises an essentially enclosed cylindrical body 26a defining therein an enclosed chamber. A piston 26c is thrustingly and slidably disposed within the enclosed chamber of the hydraulic cylinder 26 for defining in the latter a working chamber 26d. The piston 26c is connected to the associated one of suspension member 24 via a piston rod 26b. Suspension coil springs 25 are also provided in the respective suspension mechanisms. However, in contrast to the normal or ordinary suspension systems, the suspension coil spring to be employed in the shown type of the suspension system is not required to provide a resilient force in a magnitude required in the ordinary suspension system and is only required to provide the resilient force necessary for maintaining the vehicular body about the suspension member.

The working chamber 26d of the hydraulic cylinder 26 is connected one of pressure control valves $28_{FL}$, $28_{FR}$, $28_{RL}$ and $28_{RR}$ via a pressure control line 38. The pressure control valve $28_{FL}$, $28_{FR}$, $28_{RL}$, and $28_{RR}$ will be hereafter represented by the reference numeral "28" as generally referred to. The pressure control valve 28 has a control port 28c communicated with the working chamber 26d via the pressure control line 38. The pressure control valve 28 also has an inlet port 28s and a drain port 28r. The inlet port 28s of the pressure control valve 28 is connected to a pressure source unit 16 via a supply line 35, and the drain port 28r thereof is communicated with a drain line 37. The pressure control valve 28 incorporates a proportioning solenoid 26e for adjusting valve position according to the magnitude of suspension control signals $I_{FL}$, $I_{FR}$, $I_{RL}$ and $I_{RR}$ supplied from the control unit 100. The suspension control signals $I_{FL}$, $I_{FR}$, $I_{RL}$ and $I_{RR}$ are current signals each having a variable current value representative of the corresponding pressure in the working chamber. A branch circuit is provided for connecting the working chamber 26d to a pressure accumulator 34 via a flow path 33 and a flow restricting means, such as an orifice 32. This pressure accumulator 34 may be hereafter referred to as "low pressure accumulator". Other pressure accumulators 20F and 20R are provided in the supply line 35 for accumulating excessive pressure generated in the pressure source unit 16.

The pressure control valves 28 comprise, though it is not clearly shown in FIG. 1, electrically or electromagnetically operable actuators, such as proportioning solenoids. The hydraulic cylinder 26 and the pressure control valve 28 may be of any suitable constructions for adjusting damping characteristics with sufficiently high response. Typical constructions of the hydraulic cylinder 26 and the pressure control valve 28 have been disclosed in the following:

U.S. Pat. No. 4,948,165; and
U.S. Pat. No. 4,911,470;

The disclosures of the foregoing patents are incorporated herein by reference for the sake of disclosure contained therein.

The pressure control valve 28 employed in the shown embodiment incorporates a proportioning solenoid 28e for adjusting valve position and thus adjusts control pressure to be supplied to the working chamber 26d of the associated one of the hydraulic cylinder 26. In practice, the pressure control valve employed in the shown embodiment is designed as a pilot operated valve, in which the pilot pressure is adjusted by the position of the proportioning solenoid.

For adjusting control pressure at the control port 28c by the proportioning solenoid 28e, a suspension control command is provided which is in a form of a current signal having a variable current depending upon the command value. The suspension control command is generated by a control unit 100. In order to perform height regulation and attitude regulation for the vehicular body, the control unit 100 is connected to a plurality of sensors for monitoring various suspension control parameters. Parameters for performing suspension control and data processing for deriving the suspension control command values are discussed in the above-cited patents and the like. The following disclosure focuses on anti-rolling suspension control which may be combined with any other logic of suspension control.

In order to perform anti-rolling suspension control, according to the present invention, the control unit 100 in the preferred embodiment of the active suspension system is connected to a lateral acceleration sensor $102_F$ for monitoring lateral acceleration exerted on a preselected position on the vehicular body. The lateral acceleration sensor $102_F$ produces a lateral acceleration indicative signal $Y_{GF}$ representative of the monitored magnitude of lateral acceleration exerted at the preselected point. This lateral acceleration indicative signal $Y_{GF}$ is used for controlling suspension characteristics of the front-left and front-right suspension systems $14_{FL}$ and $14_{FR}$. Therefore, this lateral acceleration sensor $102_F$ will be hereafter referred to as "front controlling lateral acceleration sensor", and the lateral acceleration indicative signal $Y_{GF}$ will be hereafter referred to as "front controlling lateral acceleration indicative signal". Similarly, another lateral acceleration sensor $102_R$ for monitoring lateral acceleration exerted on another preselected position on the vehicular body. The lateral acceleration sensor $102_R$ produces a lateral acceleration indicative signal $Y_{GR}$ representative of the monitored magnitude of lateral acceleration exerted at the preselected point. This lateral acceleration indicative signal $Y_{GR}$ is used for controlling suspension characteristics of the rear-left and rear-right suspension systems $14_{RL}$ and $14_{RR}$. Therefore, this lateral acceleration sensor $102_R$ will be hereafter referred to as "rear controlling lateral acceleration sensor", and the lateral acceleration indicative signal $Y_{GR}$ will be hereafter referred to as "rear controlling lateral acceleration indicative signal".

Figure 3:
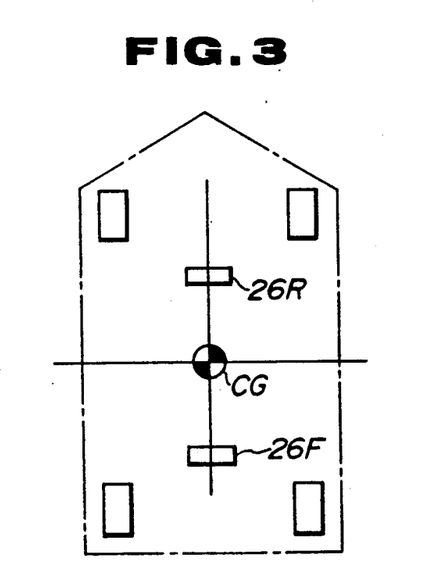
FIG. 3 is an illustration showing positions of lateral acceleration sensors provided on the vehicular body.
Figure 4:
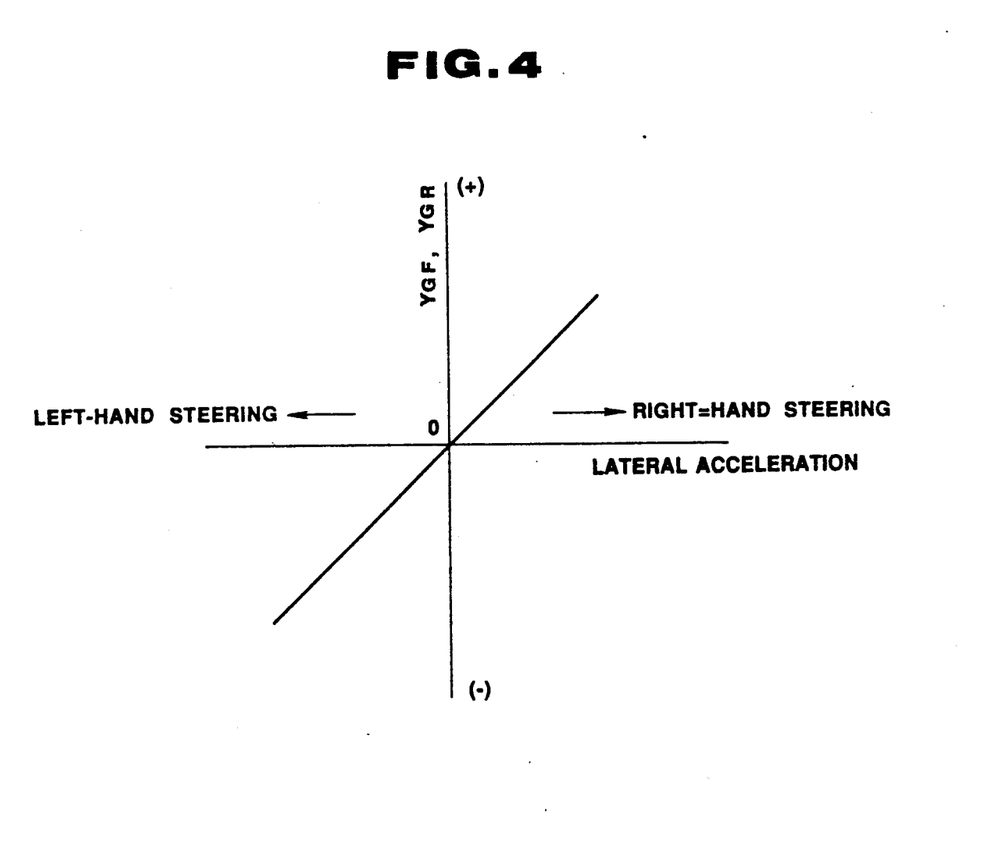
FIG. 4 is a chart showing a relationship between lateral acceleration exerted on the vehicular body and voltage level of a lateral acceleration sensor.

Each of the front controlling and rear controlling lateral acceleration sensors $102_F$ and $102_R$ is designed to produce the front controlling and rear controlling lateral acceleration indicative signals $Y_{GF}$ and $Y_{GR}$ variable of the value across zero depending upon the direction of the lateral acceleration exerted on the monitoring point, as shown in FIG. 4. Positive values of the lateral acceleration indicative signals $Y_{GF}$ and $Y_{GR}$ represent right-hand steering and negative values thereof represent left-hand steering. In the shown embodiment, the front controlling lateral acceleration sensor $102_F$ is oriented at a position longitudinally off-set rearwardly from a gravity center point CG, as shown in FIG. 3. On the other hand, the rear controlling lateral acceleration sensor $102_R$ is oriented at a position longitudinally off-set frontwardly from the gravity center point CG.

Figure 5:
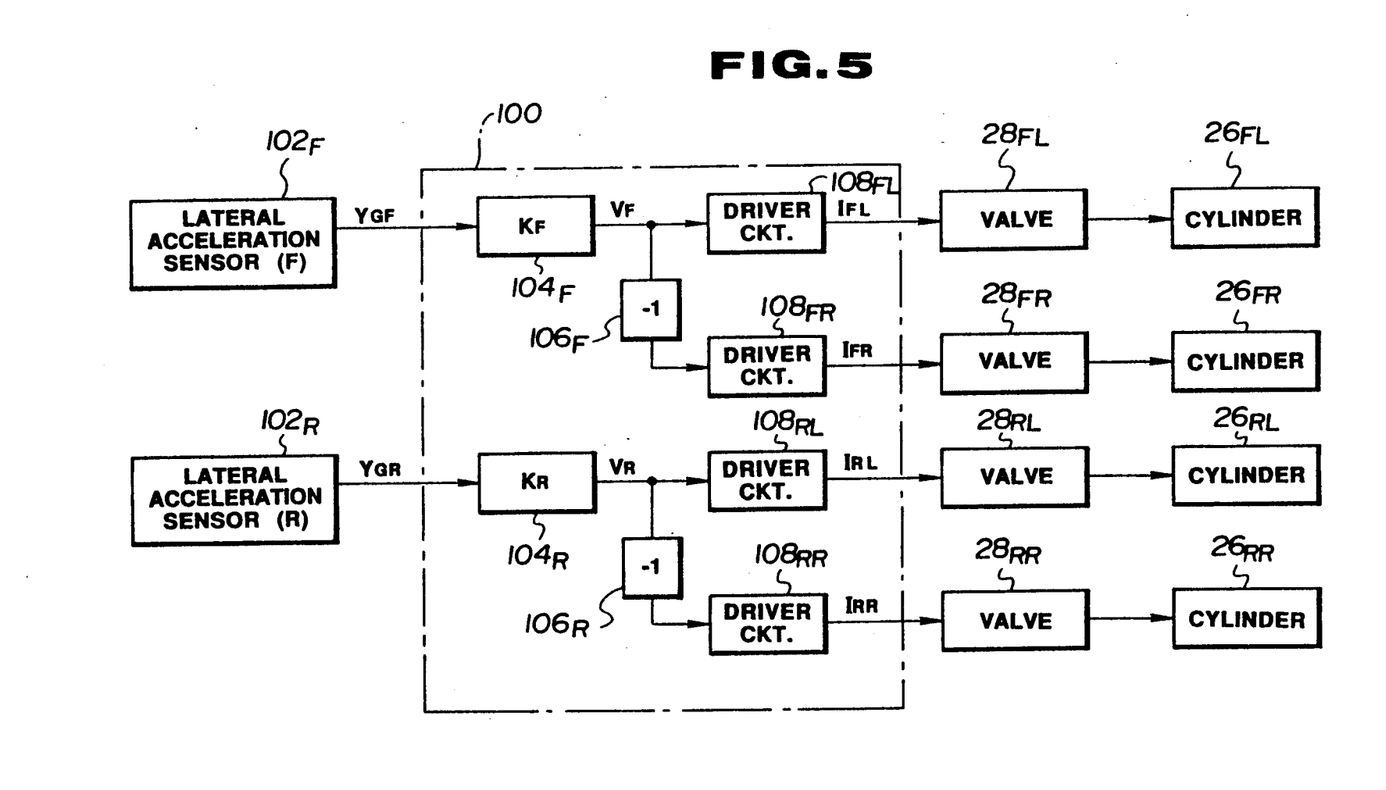
FIG. 5 is a block diagram of the first embodiment of a suspension control system employed in the preferred embodiment of the active suspension system of FIG. 1.

As shown in FIG. 5, the control unit 100 comprises a gain amplifier 104 which is provided an amplifier gain $K_F$. The gain amplifier 104 receives the front controlling lateral acceleration indicative signal $Y_{GF}$ to amplify with the amplifier gain $K_{YF}$ to output voltage signal $V_F$. Another gain amplifier 106 is also provided to receive the rear controlling lateral acceleration indicative signal $Y_{GR}$. The gain amplifier 106 is provided a predetermined amplifier gain $K_R$ for amplifying the rear controlling lateral acceleration indicative signal $Y_{GR}$ to output voltage signal $V_R$.

Respective of the gain amplifiers 104 and 106 are directly connected to front-left and rear-left driver circuits $108_{FL}$ and $108_{RL}$ for feeding respective voltage signals $V_F$ and $V_R$. On the other hand, the gain amplifiers 104 and 106 are connected to front-right and rear-right driver circuits $108_{FR}$ and $108_{RR}$ via inverters $110_F$ and $110_R$ to feed the voltage signals $V_F$ and $V_R$ in inverted polarity. Therefore, for the front-right driver circuit $108_{FR}$, the voltage signal $V_F$ having the equal value but opposite polarity to that supplied to the front-left driver circuit $108_{FL}$, is supplied. Similarly, for the rear-right driver circuit $108_{RR}$, the voltage signal $V_R$ having the equal value but opposite polarity to that supplied to the rear-left driver circuit $108_{RL}$, is supplied.

Respective of the driver circuits $108_{FL}$, $108_{FR}$, $108_{RL}$ and $108_{RR}$ derive suspension control commands $I_{FL}$, $I_{FR}$, $I_{RL}$ and $I_{RR}$ on the basis of he received voltage signals $V_F$ and $V_R$. The driver circuits $108_{FL}$, $108_{FR}$, $108_{RL}$ and $108_{RR}$ may comprise floating type constant-current circuits for converting voltage signals into current signals. Therefore, the driver circuits $I_{FL}$, $I_{FR}$, $I_{RL}$ and $I_{RR}$ produces the suspension control commands $I_{FL}$, $I_{FR}$, $I_{RL}$ and $I_{RR}$ as current signals of variable magnitude of current levels depending upon the command values which represent required control pressure $P_C$ supplied to the working chambers 26d of the hydraulic cylinders 26 from the pressure control valves 28. The suspension control commands $I_{FL}$, $I_{FR}$, $I_{RL}$ and $I_{RR}$ are supplied to the proportioning solenoids 26e of respective pressure control valves 28 in order to set respective pilot pressures at the commanded level.

Figure 6:
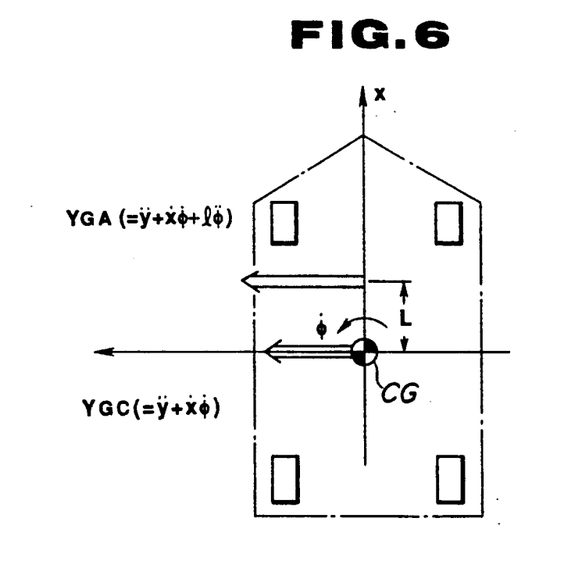
FIG. 6 is an illustration of a model used for discussion about lateral acceleration to be exerted on the vehicular body.

Operation of the foregoing embodiment will be discussed herebelow. Considering a coordinate system fixed at the vehicle having x-axis along the longitudinal axis of the vehicle and y-axis along a transverse axis extending across the center of gravity and perpendicular to the longitudinal axis, the vehicle acts in x-axis direction, y-axis direction and yawing direction on the coordinate system as shown in FIG. 6. The lateral acceleration $Y_{GC}$ at the center of gravity CG can be expressed by:

$$Y_{GC} = \ddot{y} + \dot{x}\dot{\phi}$$

Then, the lateral acceleration $Y_{GA}$ at a point longitudinally shifted frontwardly in a magnitude L(m), can be expressed by:

$$Y_{GA} = \ddot{y} + \dot{x}\dot{\phi} + L\ddot{\phi} \quad (1)$$

where $\ddot{\phi}$ is yawing angular acceleration Here, assuming that the point where the lateral acceleration $Y_{GA}$ is zero, is $P_O$, this $P_O$ point should be oriented at an orientation frontwardly shifted from the center of gravity by a magnitude $L_O$ which can be expressed by:

$$L_O = (\ddot{y} + \dot{x}\dot{\phi})/-\ddot{\phi}(m)$$

Figure 7A:
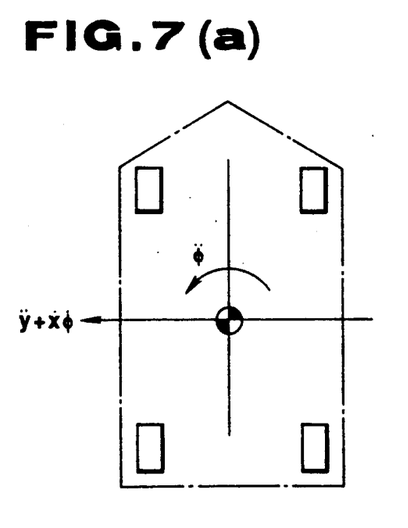
FIGS. 7(a) and 7(b) are illustrations showing relationships between lateral acceleration and yawing angular acceleration upon entering into and exiting from a curve.
Figure 7B:
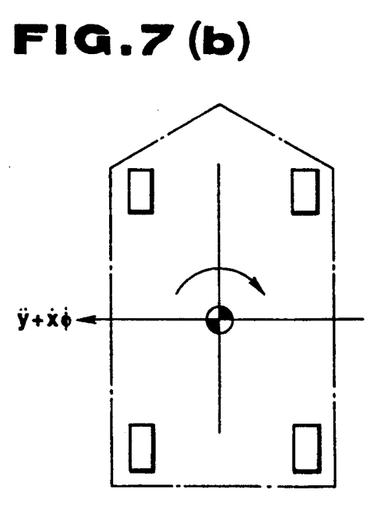
Figure 8A:
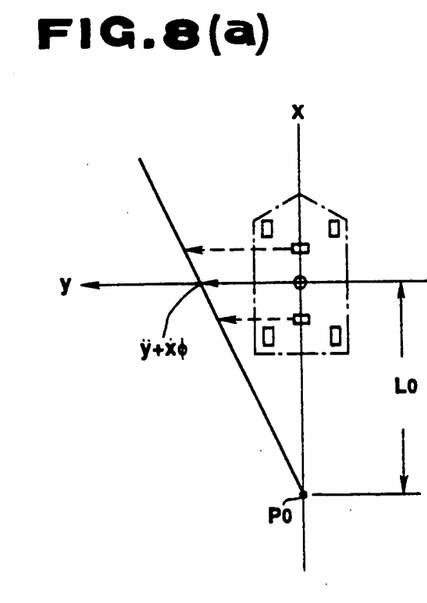
FIGS. 8(a) and 8(b) are illustrations showing variations of lateral acceleration upon entering into and exiting from the curve.
Figure 8B:
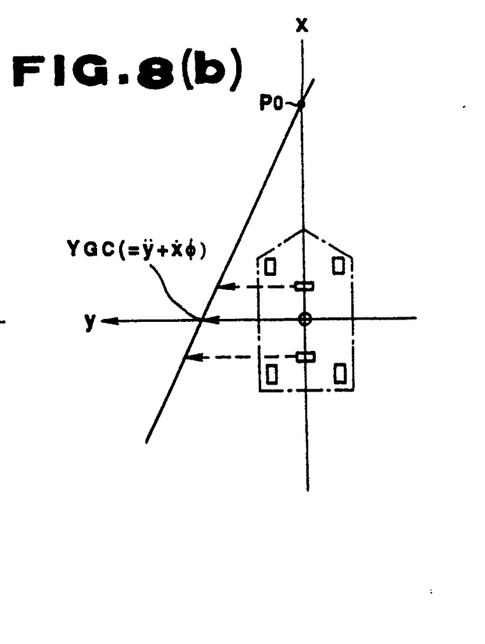

The sign (polarity) of $L_O$ is variable depending upon signs of the lateral acceleration $(\ddot{y} + \dot{x}\dot{\phi})$ and yawing angular acceleration $\ddot{\phi}$. Thus, when the signs of the lateral acceleration $(\ddot{y} + \dot{x}\dot{\phi})$ and yawing angular acceleration $\ddot{\phi}$ are the same, the sign of $L_O$ becomes negative. On the other hand, when the signs of the lateral acceleration $(\ddot{y} + \dot{x}\dot{\phi})$ and yawing angular acceleration $\ddot{\phi}$ are different from each other, the sign of $L_O$ becomes positive. Therefore, as can be seen from FIGS. 7(a) and 7(b), when steering is displaced toward the desired angular position from the neutral position for running through the curve, the signs of the lateral acceleration $(\ddot{y} + \dot{x}\dot{\phi})$ and yawing angular acceleration $\ddot{\phi}$ become the same to each other (FIG. 7(a)). On the other hand, when the vehicle steering is displaced to return to the neutral position for exiting the curve, the signs of the lateral acceleration $(\ddot{y} + \dot{x}\dot{\phi})$ and yawing angular acceleration $\ddot{\phi}$ becomes different from each other as shown in FIG. 7(b). Therefore, at a curve entry transition in which steering is displaced toward the desired angular position at the entry of the curve, the position of $P_O$ point is off-set rearwardly from the gravity center point CG as shown in FIG. 8(a). On the other end, at curve exit transition where the steering is returned to the neutral position for exiting curve and for running straight, the position of the $P_0$ point is shifted frontwardly from the gravity center point CG as shown in FIG. 8(b).

In the shown embodiment, since the rear controlling lateral acceleration sensor $102_R$ is located at a position frontwardly off-set from the position of the front controlling lateral acceleration sensor $102_F$, the magnitude of the lateral acceleration monitored by the rear controlling lateral acceleration sensor $102_R$ becomes greater than that monitored by the front controlling lateral acceleration sensor $102_F$ at the curve entry transition since the $P_O$ point is shifted rearwardly from the gravity center point CG. Therefore, the magnitude of the rear-left and rear-right suspension control commands $I_{RL}$ and $I_{RR}$ becomes so derived as to cause a greater magnitude of transverse shifting of vehicular load than that at the front suspension systems. This increases over-steering characteristics of the vehicle for permitting easy turning.

On the other hand, at the curve exit transition, since the $P_O$ point is frontwardly shifted from the gravity center point CG, the magnitude of lateral acceleration monitored by the rear controlling lateral acceleration sensor $102_R$ becomes smaller than that monitored by the front controlling lateral acceleration sensors $102_F$. Therefore, transverse shifting of the vehicular load at the rear suspension systems becomes smaller than that at the front suspension systems to increase under-steering characteristics. This assists in increasing vehicular stability at the exit of the curve.

Taking the foregoing discussion into account, the practical suspension control implemented by the shown embodiment of the active suspension system will be discussed. Assuming that the vehicle is running on a smooth straight road, no lateral acceleration will be exerted on the vehicular body. Therefore, the front and rear controlling lateral acceleration indicative signal values $Y_{GF}$ and $Y_{GR}$ respectively monitored by the front and rear controlling lateral acceleration sensors $102_F$ and $102_R$ are maintained at substantially zero (0). As a result, the suspension control commands $I_{FL}$, $I_{FR}$, $I_{RL}$ and $I_{RR}$ are also maintained at substantially zero value. Therefore, the proportioning solenoids 28e of the pressure control valves 28 are maintained in deenergized states. Therefore, the control pressure Pc having a predetermined off-set pressure $P_O$ is supplied for respective of the working chambers 26d of the hydraulic cylinders 26.

At this condition, i.e., at the relatively low frequency of vibration in the vicinity of the resonance frequency of the sprung mass (the vehicular body), can be absorbed by the action of valve spools in the pressure control valve 28. On the other hand, a relatively high frequency vibration having a frequency in the vicinity of the resonance frequency of the unsprung mass (road wheel) can be absorbed by flow restriction orifices 32 and the pressure accumulators 34. Therefore, vehicular riding comfort can be assured.

When right-hand steering operation is made for turning right, the vehicle rolls for lowering left side (outside of the corner). At this time, the front and rear controlling lateral acceleration indicative signal values $Y_{GF}$ and $Y_{GR}$ become positive values. The gain amplifiers $102_F$ and $104_R$ thus output voltage signals $V_F$ and $V_R$ by amplifying the lateral acceleration indicative signals $Y_{GF}$ and $Y_{GR}$ with respective amplifier gains $K_F$ and $K_R$. Therefore, positive voltage signals $V_F$ and $V_R$ are supplied to the front-left and rear-left driver circuits $108_{FL}$ and $108_{RL}$ becomes positive. As a result, positive values of the front-left and rear-left suspension control commands $I_{FL}$ and $I_{RL}$ are supplied to the proportioning solenoids 28e of the front-left and rear-left pressure control valves 28$_{FL}$ and 28$_{RL}$. On the other hand, since the negative values of the voltage signals —V$_F$ and —V$_R$ are supplied to the front-right and rear-right driver circuits 108$_{FR}$ and 108$_{RR}$ via the inverters 106$_F$ and 106$_R$. Therefore, negative values of the front-right and rear-right suspension control commands —I$_{FR}$ and —I$_{RR}$ are supplied to the proportioning solenoids 28e of the front-right and rear-right pressure control valves 28$_{FR}$ and 28$_{RR}$ from the front-right and rear-right driver circuits 108$_{FR}$ and 108$_{RR}$. Therefore, the fluid pressures in the working chambers 26d of the front-left and rear-left hydraulic cylinders 26$_{FL}$ and 26$_{RL}$ are adjusted to be higher for obtaining harder damping characteristics and the fluid pressures in the working chambers 26d of the front-right and rear-right hydraulic cylinders 26$_{FR}$ and 26$_{RR}$ are adjusted to be lower for obtaining softer damping characteristics. By this, anti-rolling for suppressing magnitude of vehicular rolling can be achieved.

In the shown embodiment, since the front controlling lateral acceleration sensor 102$_F$ is oriented at the position rearwardly off-set from the gravity center position CG and the rear controlling lateral acceleration sensor 102$_R$ is oriented at the position frontwardly off-set from the gravity center point, the rear controlling lateral acceleration indicative signal Y$_{GR}$ becomes greater than that of the front controlling lateral acceleration indicative signal Y$_{GF}$ at the curve entry transition. Therefore, the magnitude of adjustment of the fluid pressure at the rear-left and rear-right hydraulic cylinders 26$_{RL}$ and 26$_{RR}$ becomes greater than that at the front-left and front-right hydraulic cylinders 26$_{FL}$ and 26$_{FR}$ for causing greater magnitude of lateral shift of the load. Therefore, over-steering characteristics are increased during curve entry transition for easier turning. On the other hand, the rear controlling lateral acceleration indicative signal Y$_{GR}$ becomes smaller than that of the front controlling lateral acceleration indicative signal Y$_{GF}$ at the curve exit transition. Therefore, the magnitude of adjustment of the fluid pressure at the rear-left and rear-right hydraulic cylinders 26$_{RL}$ and 26$_{RR}$ becomes smaller than that at the front-left and front-right hydraulic cylinders 26$_{FL}$ and 26$_{FR}$ for causing smaller magnitude of lateral shift of the load. Therefore, understeering characteristics are increased during curve exit transition for increasing vehicular driving stability.

Equivalent control for left-hand steering can be performed for successfully suppressing vehicular rolling with variation of steering characteristics at the curve entry transition and the curve exit transition.

Figure 9:
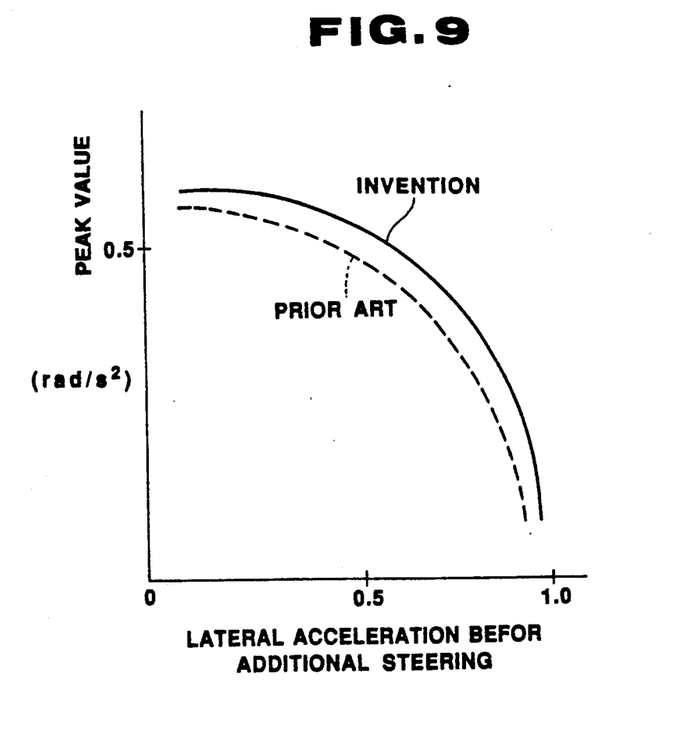
FIG. 9 is a chart showing results of a simulation, showing relationship between lateral speed and the peak value of yawing angular acceleration.
Figure 10:
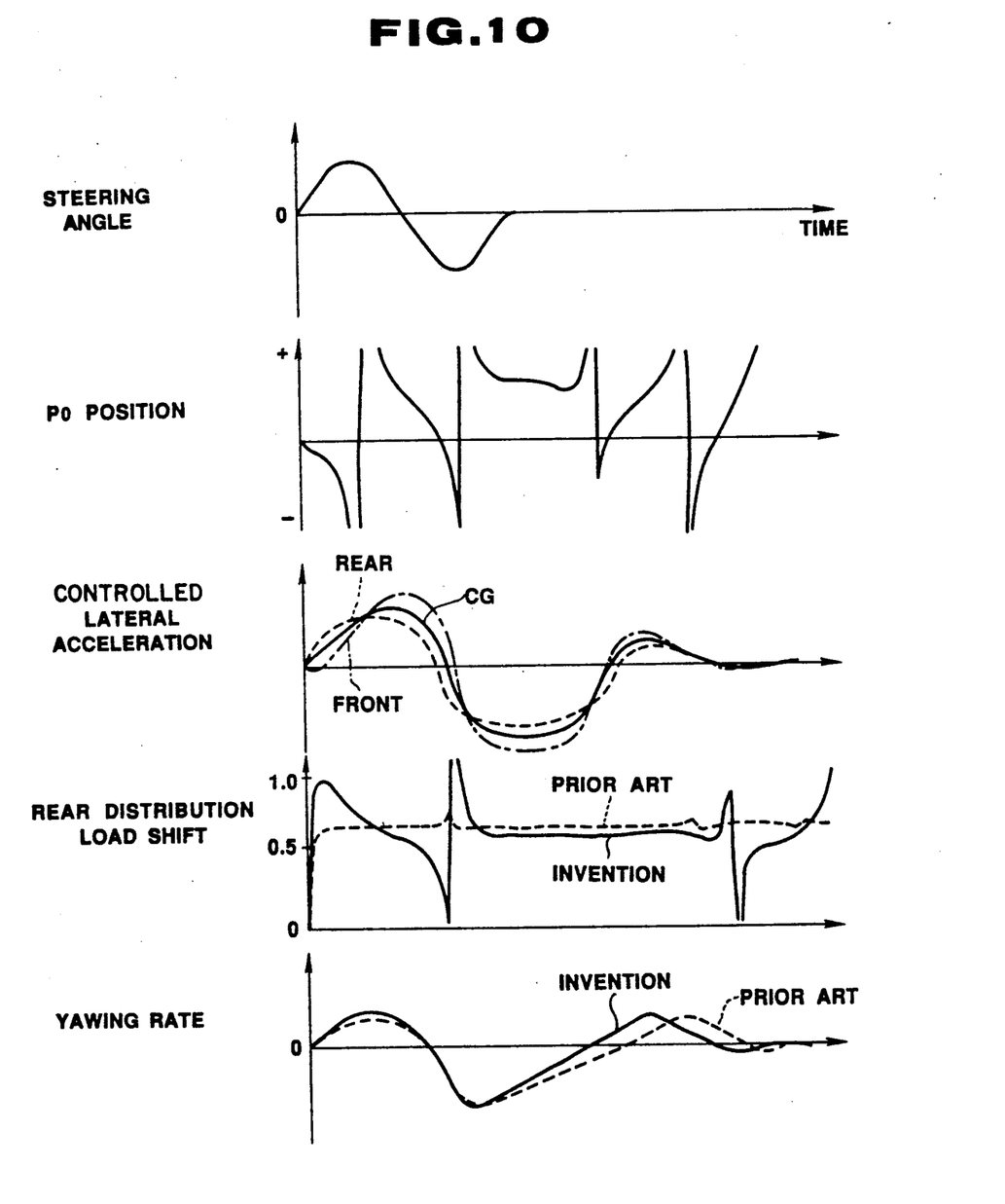
FIG. 10 is a timing chart showing operation of the first embodiment of the suspension control system of FIG. 5.

FIG. 9 shows results of a simulation performed for demonstrating the improvement of vehicular cornering performance. The simulation was taken place by increasing of the steering angle from constant curve driving on a circle having 40 m of radius. The steering angle was increased for 60°. In the simulation, peak valves of yawing angular acceleration were measured. In FIG. 9, the solid line shows the peak values obtained in the shown embodiment and the broken line shows the peak values obtained in the conventional active suspension system. As can be seen herefrom, the vehicular driving stability can be improved in the shown embodiment.

Further simulation was performed by performing zigzag driving so as to drive the vehicle on a trace of sine curve. Steering angle, variation of lateral acceleration, position of the P$_0$ point, values of the front and rear controlling lateral acceleration indicative signals Y$_{GF}$ and Y$_{GR}$, distribution of load shifting at the rear suspension systems and yawing rate on the vehicular body are arithmetically simulated. The results of simulation are illustrated in FIGS. 10(a) to 10(e). As can be seen from FIG. 10, it can be clearly appreciated that the shown embodiment improves both of turning ability at the curve entry transition and stability at the curve exit transition.

Though the shown embodiment arranges the front and rear controlling lateral acceleration sensors 102$_F$ and 102$_R$ at orientation respectively shifted rear and front sides of the gravity center CG, the orientation of the lateral acceleration sensors should not be specified to the shown positions. An essential feature of the present invention is to arrange the rear controlling lateral acceleration sensor at a frontwardly shifted position with respect to the front controlling lateral acceleration sensor. Thus, as long as the rear controlling lateral acceleration sensor is maintained at the position frontwardly off-setting from the front controlling lateral acceleration sensor, both of the lateral acceleration sensors can be oriented at frontwardly or rearwardly shifted position relative to the center of gravity. For instance, when both of the front and rear controlling lateral acceleration sensors 102$_F$ and 102$_R$ are positioned in front of the center of gravity CG, the sensitivity of lateral acceleration can be increased due to presence of the yawing angular acceleration $\phi$. Increased sensitivity may serve as a phase advancing factor for compensating lag in the control system including the pressure control valve.

Figure 11:
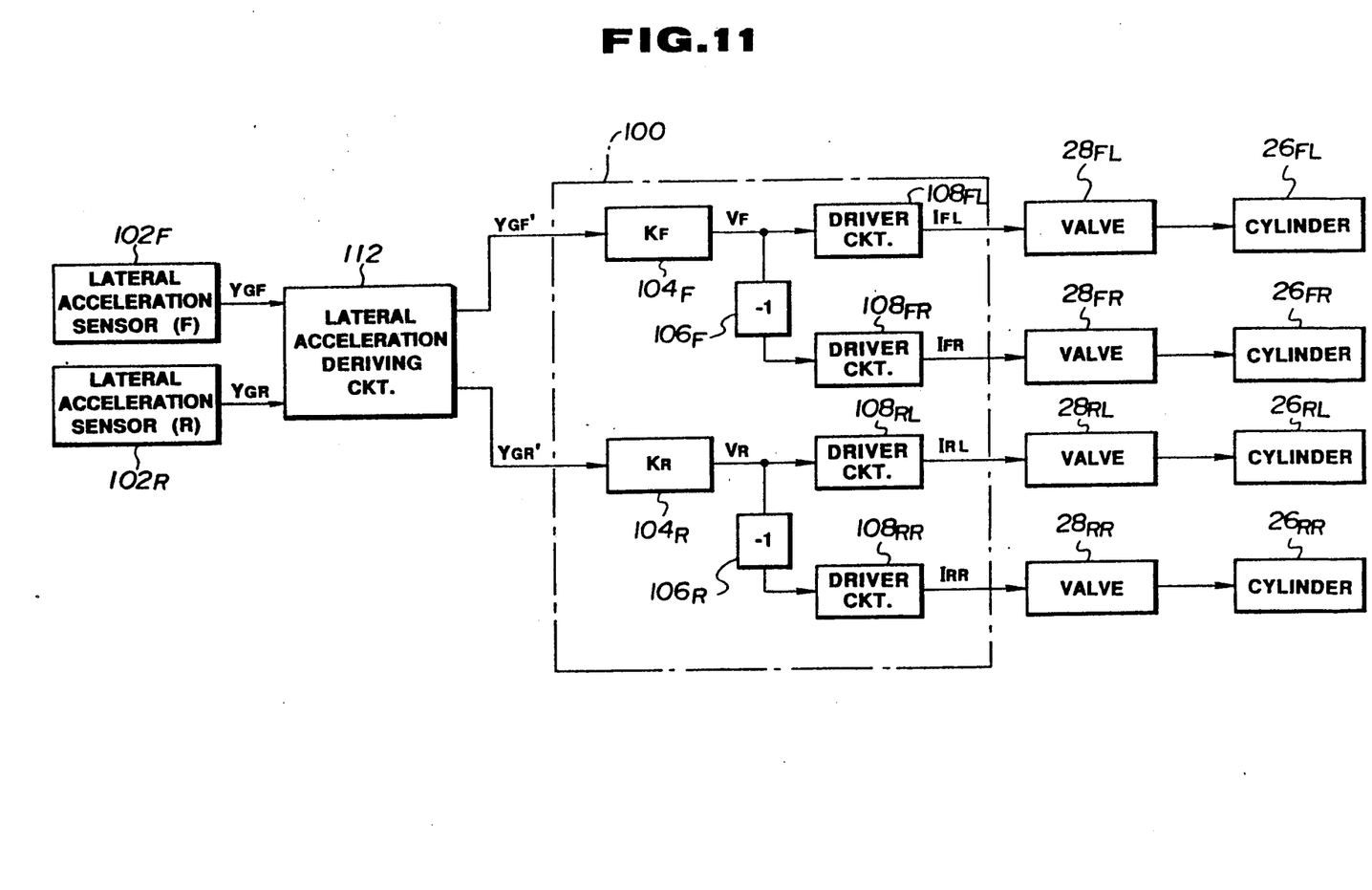
FIG. 11 is a block diagram of the second embodiment of the suspension control system to be employed in the preferred embodiment of the active suspension system.
Figure 12:
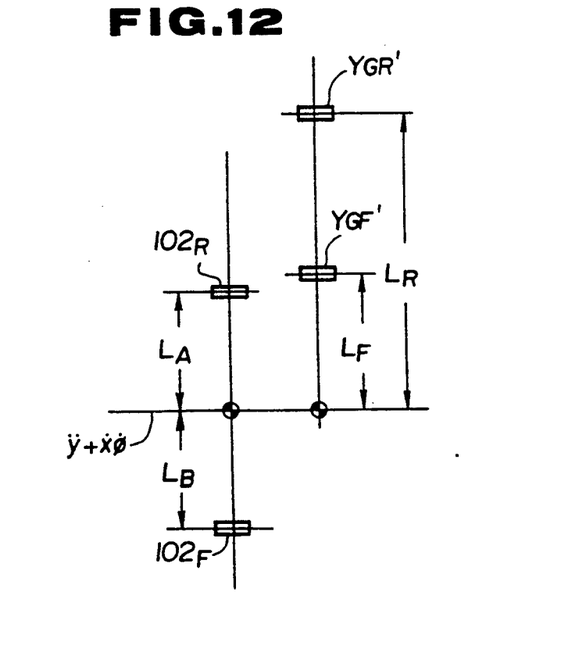
FIG. 12 is an illustration showing an arrangement of lateral acceleration sensors and optimum positions for deriving the lateral accelerations.

FIGS. 11 and 12 show the second embodiment of the suspension control system which can be employed in the preferred embodiment of the active suspension system. In this embodiment, lateral acceleration at a desired position is arithmetically derived on the basis of the lateral acceleration indicative signals produced by a pair of lateral acceleration sensors.

As shown in FIG. 11, a lateral acceleration deriving circuit 112 is provided between the front and rear controlling lateral acceleration sensors 102$_F$ and 102$_R$ and the gain amplifiers 104$_F$ and 104$_R$. The lateral acceleration deriving circuit 112 receives the front and rear controlling lateral acceleration indicative signals Y$_{GF}$ and Y$_{GR}$. The lateral acceleration deriving circuit 112 derives front and rear lateral acceleration indicative data Y$_{GF}'$ and Y$_{GR}'$ at different desired points which are off-set from each other in longitudinal direction. Other components in the control system are substantially identical to that of the former embodiment.

The lateral acceleration deriving circuit 112 receives both of the front and rear controlling lateral acceleration indicative signals Y$_{GF}$ and Y$_{GR}$ from the front and rear controlling lateral acceleration sensors 102$_F$ and 102$_R$. Here, it is assumed that the distances at the front and rear controlling lateral acceleration sensors 102$_F$ and 102$_R$ from the center of gravity CG are respectively L$_A$ and L$_B$, and that the distances at the points, about which the lateral acceleration data Y$_{GF}'$ and Y$_{GR}'$ are respectively L$_F$ and L$_R$. Then, the lateral acceleration indicative data Y$_{GF}'$ and Y$_{GR}'$ are expressed by:

$$Y_{GF}' = \frac{L_B \cdot Y_{GF} + L_A \cdot Y_{GR}}{L_A + L_B} + L_F \frac{Y_{GF} - Y_{GR}}{L_A + L_B} \quad (2)$$

$$Y_{GR}' = \frac{L_B \cdot Y_{GF} + L_A \cdot Y_{GR}}{L_A + L_B} + L_R \frac{Y_{GF} - Y_{GR}}{L_A + L_B} \quad (3)$$

In the foregoing equations (2) and (3), the first terms on the right sides respectively represent lateral acceleration $Y_{GC}(=y+x\phi)$ and the second terms on the right sides $(Y_{GF}-Y_{GR})/(L_A+L_B)$ represent the yawing acceleration $\phi$.

As can be appreciated, in this embodiment, the lateral acceleration indicative data at any desired point can be arithmetically derived by setting the longitudinal distance $L_A$ and $L_B$ of the lateral acceleration sensors $102_F$ and $102_R$ from the center of gravity CG and setting the longitudinal distance $L_F$ and $L_R$ of the desired points from the gravity center point. Therefore, the points to monitor lateral accelerations for controlling the front suspension systems $14_{FL}$ and $14_{FR}$ and the rear suspension systems $14_{RL}$ and $14_{RR}$ can be freely and optimally derived. Therefore, optimal vehicular cornering performance can be obtained with the lateral acceleration indicative data at the most suitable monitoring points. Furthermore, in the shown embodiment, since there should be no limitation on the actual orientation of the lateral acceleration sensors, hence designing of arrangement of the lateral acceleration sensors becomes easier.

Figure 13:
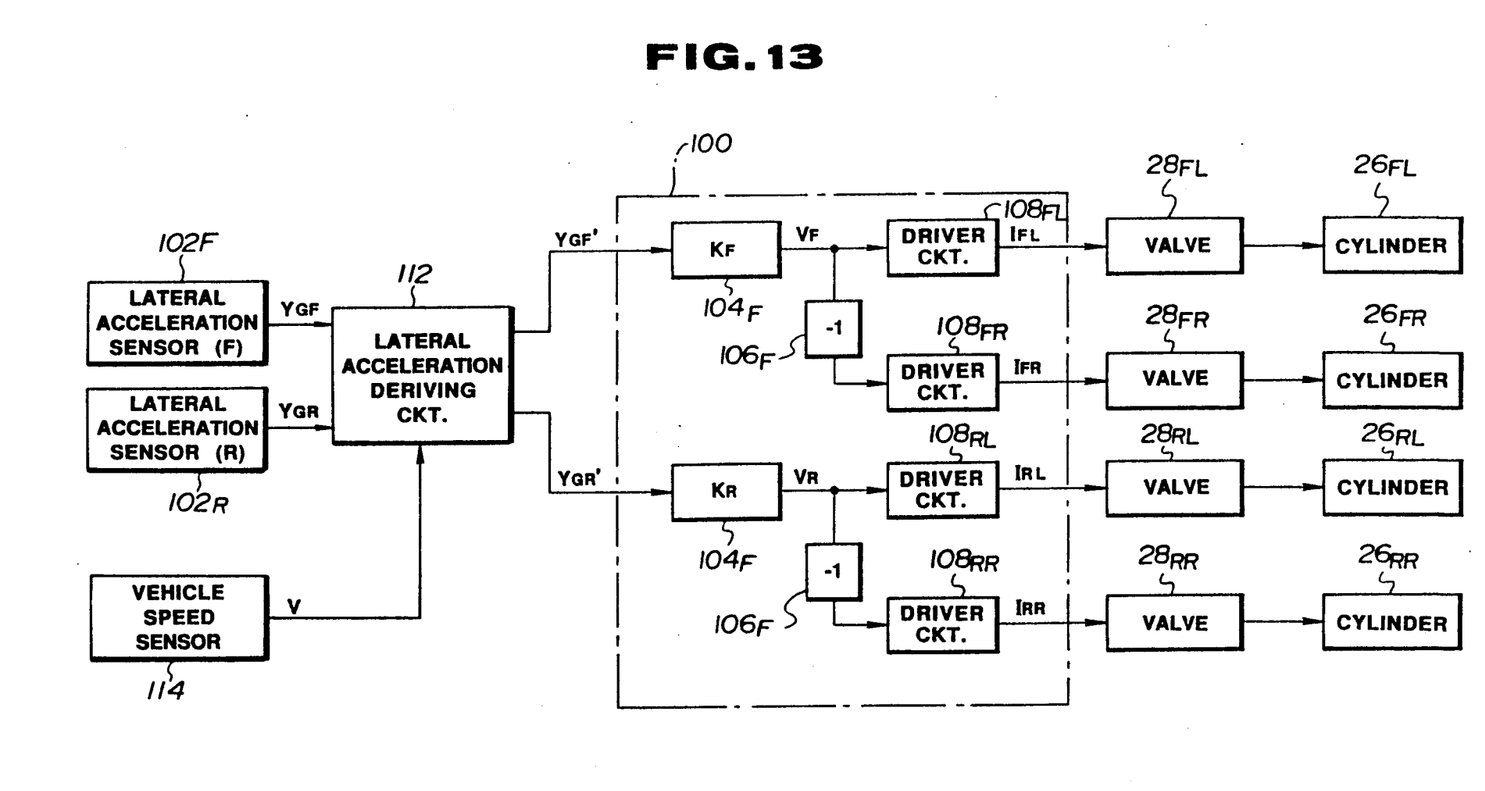
FIG. 13 is a block diagram of the third embodiment of the suspension control system to be employed in the preferred embodiment of the active suspension system.
Figure 14:
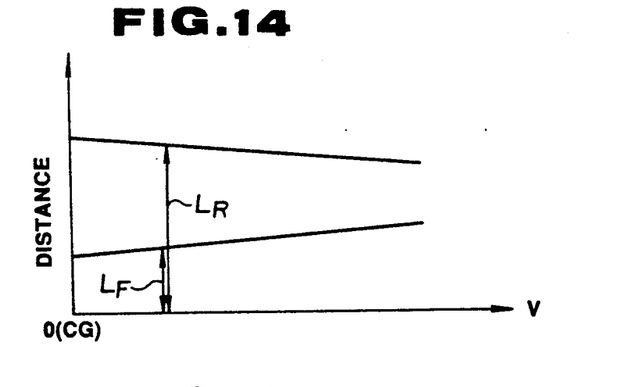
FIGS. 14 to 17 are charts showing relationships between the vehicular speed and positions on the vehicular body about which lateral accelerations are derived.

FIGS. 13 and 14 shows a further embodiment of the suspension control system applicable for the preferred embodiment of the active suspension system according to the invention. In this embodiment, a vehicle speed sensor 114 is employed for providing additional suspension control parameter. The vehicle speed sensor 114 is designed to monitor the vehicle speed to produce a vehicle speed indicative signal V. The vehicle speed indicative signal V of the vehicle speed sensor 114 is fed to the lateral acceleration deriving circuit 112'. The lateral acceleration deriving circuit 112' in this embodiment is designed to vary the points, about which the lateral acceleration indicative data $Y_{GF}$ and $Y_{GR'}$ are calculated, are shifted depending upon the vehicle speed indicative signal value V. Thus, according to vehicular speed dependent shifting of the points, the distance $L_F$ and $L_R$ is varied. Preferably, the distances $L_F$ and $L_R$ are set in a form of look-up tables which can be prepared in terms of the vehicle speed indicative data V. Typically, the variation characteristics of the distances $L_F$ and $L_R$ are set as shown in FIG. 14. Thus, as can be seen from FIG. 14, the distance $L_F$ for defining the point about which the front controlling lateral acceleration indicative data $Y_{GF}$ is derived increases according to increasing of the vehicular speed. On the other hand, the distance $L_R$ for defining the point about which the rear controlling lateral acceleration indicative data $Y_{GR'}$ is derived decreases according to increasing of the vehicular speed.

By employing the variation characteristics as shown in FIG. 14, the over-steering tendency are made relatively strong at curve entry transition at relatively low vehicle speed by setting the distance $L_R$ at relatively longer distance. On the other hand, over-steering characteristics at the curve entry transition are decreased according to increasing of the vehicular speed by setting the distance $L_R$ at relatively shorter distance. Therefore, according to the shown embodiment, excellent turning ability at low vehicle speed and satisfactorily high stability of the vehicle can be obtained.

Though the shown embodiment employs a look-up table as shown in FIG. 14 for deriving the distances $L_F$ and $L_R$, it may be possible to arithmetically derive the distance by utilizing a linear equation representing the distance variation characteristics as illustrated. Furthermore, when the lateral acceleration monitoring points for deriving the lateral acceleration indicative data $Y_{GF}$ and $Y_{GR}$ are arranged at the opposite sides of the gravity center, the characteristics, the characteristics may be modified to be seen in FIG. 12.

Figure 15:
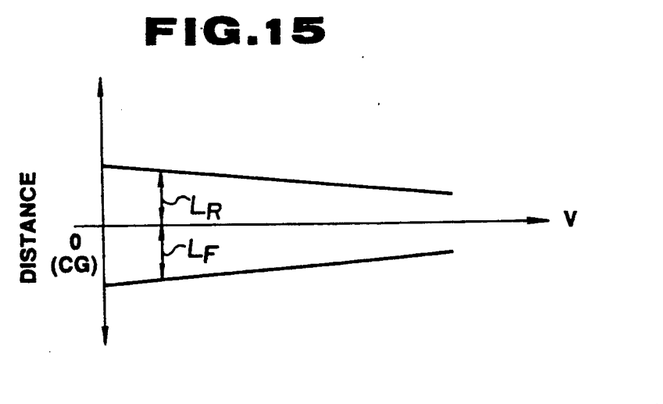
Figure 16:
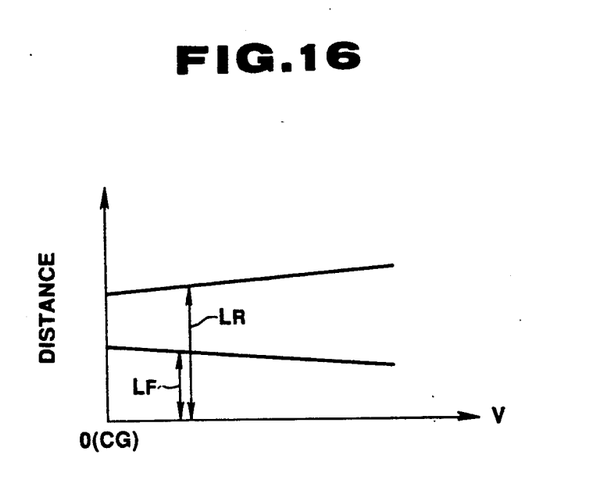
Figure 17:
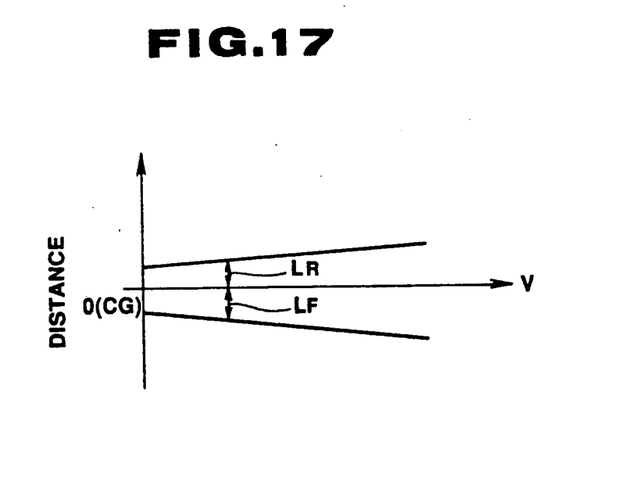

Although FIGS. 14 and 15 show variation characteristics of the distances $L_F$ and $L_R$ so that the distance $L_F$ increases according to increasing of the vehicular speed and the distance $L_R$ decreases according to increasing of the vehicular speed, it is possible to set variation characteristics opposite to these characteristics. In such case, the variation characteristics of the distances $L_F$ and $L_R$ may be illustrated as shown in FIGS. 16 and 17. By setting this, the distance $L_R$ for defining the point for deriving the rear controlling lateral acceleration indicative data $Y_{GR}$ is set to be relatively short at a relatively low vehicle speed. In contrast to this the distance $L_F$ for defining the point for deriving the front controlling lateral acceleration indicative data $Y_{GF}$ is set to be relatively long at a relatively low vehicle speed. With such characteristics, weaker under-sterring characteristics can be obtained. On the other hand, according to increasing of the vehicular speed, the difference between the distances $L_F$ and $L_R$ is increased to increase understeering characteristics at the curve exit transition. This helps to assure higher vehicular stability at higher vehicle speed.

For instance, though the shown embodiment has been concentrated to anti-rolling suspension control, the active suspension system may also perform height regulation control, anti pitching control, bouncing control and so forth. Other such suspension controls and various constructions of active suspension systems have been discussed in the above-cited U.S. patents, and all disclosures in the above-identified patents are herein incorporated by reference.

Furthermore, although the foregoing discussion has been concentrated to anti-rolling suspension control for the active suspension systems, the manner of suspension control with variable sensitivity of the lateral acceleration may be applicable for control of passive suspension systems.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A suspension control system, comprising:
   front suspension systems disposed between a front portion of a vehicular body and front wheels thereof for damping relative displacement therebetween, each of said front suspension systems having damping characteristics variable according to a front suspension control command;
   rear suspension systems disposed between a rear portion of the vehicular body and rear wheels thereof for damping relative displacement therebetween, each of said rear suspension systems having damping characteristics variable according to a rear suspension command;
   lateral acceleration monitoring means for monitoring lateral acceleration at a first position on the vehicular body for producing a first lateral acceleration indicative signal and monitoring lateral acceleration at a second position longitudinally off-set from said first position, for producing a second lateral acceleration indicative signal; and a control unit receiving said first and second lateral acceleration indicative signals for deriving said front suspension control command on the basis of said first lateral acceleration indicative signal and deriving said rear suspension control command on the basis of said second lateral acceleration indicative signal, for suppressing vehicular rolling motion.

2. A suspension control system as set forth in claim 1, wherein:
said second position is oriented at a frontwardly off-set position relative to said first position.

3. A suspension control system as set forth in claim 1, wherein:
said lateral acceleration monitoring means includes a first lateral acceleration sensor arranged at a third position of the vehicular body for producing a first sensor signal representative of the lateral acceleration at said third position, a second lateral acceleration sensor arranged at a fourth position longitudinally off-set with respect to said third position for producing a second sensor signal representative of the lateral acceleration at said fourth position, and arithmetic means for arithmetically driving lateral accelerations at said first and second positions on the basis of said first and second sensor signals.

4. A suspension control system as set forth in claim 1, wherein:
said first and second positions are variable depending upon yawing angular acceleration generated about a gravity center on the vehicular body.

5. A suspension control system as set forth in claim 1, wherein:
said first and second positions are determined so that the magnitude of the lateral acceleration provided at said second position is greater than at the first position while a vehicular steering angle is displaced from a neutral angular position and the magnitude of a lateral acceleration provided at said second position is smaller than at the first position while the vehicular steering angle is displaced toward the neutral angular position.

6. A suspension control system as set forth in claim 1, further comprising:
a vehicle speed sensor for producing a vehicle speed signal representative of a sensed vehicle speed, and said first and second positions are variable depending upon the vehicle speed.

7. A suspension control system as set forth in claim 6, wherein:
said second position is shifted to decrease a distance thereof from the center of gravity of the vehicular body according to increasing of said vehicle speed and said second position is shifted to decrease a distance thereof from said first position according to increasing of said vehicle speed.

8. A suspension control system as set forth in claim 6, wherein:
said second position is shifted to increase a distance thereof from the center of gravity of the vehicular body according to increasing of said vehicle speed, and said second position is shifted to decrease a distance thereof from said first position according to increasing of said vehicle speed.

9. A suspension control system, comprising:
front suspension systems disposed between a front portion of a vehicular body and respective front wheels thereof for damping relative displacement therebetween, each of said front suspension systems having damping characteristics variable according to a front suspension control command;
rear suspension systems disposed between a rear portion of the vehicular body and respective rear wheels thereof for damping relative displacement therebetween, each of said rear suspension systems having damping characteristics variable according to a rear suspension command;
lateral acceleration monitoring means for monitoring a lateral acceleration at a first position on the vehicular body for producing a first lateral acceleration indicative signal and monitoring a lateral acceleration at a second position on the vehicular body for producing a second lateral acceleration indicative signal, the levels of the lateral acceleration sensors at said first and second positions being differentiated with respect to each other so that the magnitude of lateral acceleration at said second position is greater than that at said first position at least when the vehicular body enters a curve; and
a control unit responsive to said first and second lateral acceleration indicative signals for deriving said front suspension control command on the basis of said first lateral acceleration indicative signal and deriving said rear suspension control command on the basis of said second lateral acceleration indicative signal, for suppressing vehicular rolling motion.

10. A suspension control system as set forth in claim 1, wherein:
at least one of said first and second positions is longitudinally off-set from the center of gravity of the vehicular body.

11. A suspension control system as set forth in claim 1, wherein:
said second position is selected so as to subject to a greater magnitude of yawing angular acceleration than said first position at least at said entrance of the curve.

12. A suspension control system as set forth in claim 11, wherein:
said second position is provided at a frontwardly off-set position relative to said first position.

13. A suspension control system as set forth in claim 12 wherein:
said lateral acceleration monitoring means includes a first lateral acceleration sensor arranged at a third position on the vehicular body for producing a first sensor signal representative of the lateral acceleration at said third position, a second lateral acceleration sensor arranged at a fourth position longitudinally off-set position to said third position for producing a second sensor signal representative of the lateral acceleration at said fourth position, and arithmetic means for arithmetically driving lateral accelerations at said first and second positions on the basis of said first and second sensor signals.

14. A suspension control system as set forth in claim 12, wherein:
said first and second positions are variable depending upon a yawing angular acceleration generated about the center of gravity of the vehicular body.

15. A suspension control system as set forth in claim 12, wherein:
said first and second positions are so determined that the magnitude of lateral acceleration provided at said second position is greater at the first position at the entrance of the curve and the magnitude of lateral acceleration provided at said second position is smaller than at the first position when the vehicular body enters the curve.

16. A suspension control system as set forth in claim 12, further comprising:
a vehicle speed sensor for producing a vehicle speed signal representative of a sensed vehicle speed, and said first and second positions are variable depending upon the vehicle speed.

17. A suspension control system as set forth in claim 16, wherein:
said second position is shifted to decrease a distance thereof from the center of gravity of the vehicular body according to increasing of said vehicular speed, and said second position is shifted to decrease a distance thereof from said first position according to increasing of aid vehicle speed.

18. A suspension control system as set forth in claim 16, wherein:
said second position is shifted to increase a distance thereof from the center of gravity of the vehicular body according to increasing of said vehicular speed, and said second position shifted to increase a distance thereof from said first position according to increasing of said vehicle speed.

* * * * *